E. E. NOVOTNY.
PRINTING PLATE MATRIX.
APPLICATION FILED MAY 20, 1916.
1,319,106.
Patented Oct. 21, 1919.
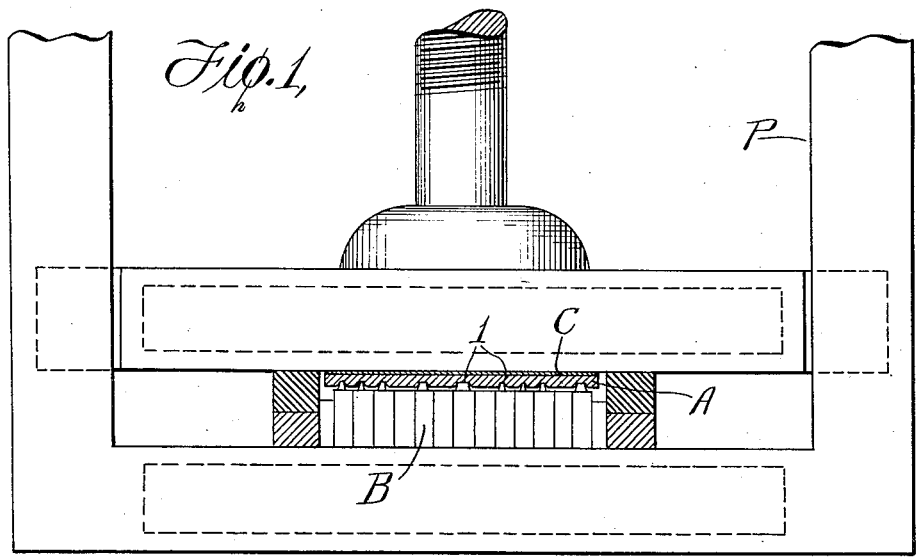
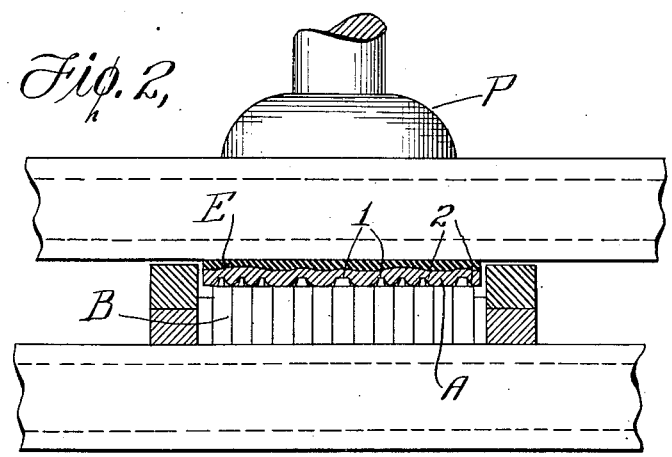
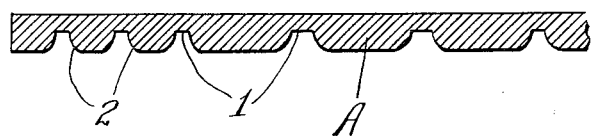
Inventor
Emil E. Novotny
By his Attorneys
Meyers, Cushman & Rea

UNITED STATES PATENT OFFICE.

EMIL E. NOVOTNY, OF RIVERSIDE, ILLINOIS, ASSIGNOR TO J. STOGDELL STOKES, OF MOORESTOWN, NEW JERSEY.

PRINTING-PLATE MATRIX.

1,319,106.      Specification of Letters Patent.      Patented Oct. 21, 1919.

Application filed May 20, 1916. Serial No. 98,906.

*To all whom it may concern:*

Be it known that I, EMIL E. NOVOTNY, a citizen of the United States, residing at Riverside, in the county of Cook and State of Illinois, have invented certain new and useful Improvements in Printing-Plate Matrices, of which the following is a specification.

This invention relates to certain novel and useful improvements in a matrix or mold for making printing plates, either flat or curved, and has particular application to a matrix or mold made from a single homogeneous lead sheet or plate.

While any suitable material may be employed for making a printing plate with my matrix or mold, the latter will be found particularly useful in the molding of the printing plate made from a body of plastic or cementitious material such as a phenolic condensation product or synthetic resin, of which there are a number of well known varieties, known to the trade as bakelite, condensite and the like, the use of such material for making the plate being referred to in my copending application Serial No. 98,905.

In my copending application, Serial No. 98,905, filed May 20, 1916, I have described a method of making a printing plate matrix or mold so that but comparatively little make-ready work will be necessary on the part of the pressman in connection with a printing plate produced by such matrix or mold, and the present invention pertains to one style or type of matrix or mold which may be produced by this method by pressure, or by heat and pressure.

In carrying out my invention it is my purpose to provide a matrix or mold composed of a single or homogeneous sheet of metal preferably lead, possessing considerable plasticity, but relatively little ductility. This sheet is adapted to be impressed with a body of type matter, relief plate or the like in such manner that the mold or matrix will constitute a reversed facsimile of the type matter or plate, the sheet during the making of the matrix or mold being subject to heat and pressure under such conditions as to produce sharp glossy type-face-molding portions of sufficient depth, with well rounded swelled or curved non type-face-forming portions therebetween. These results are attained because of the fact that the body of the mold is made out of lead, which as above indicated possesses a requisite degree of plasticity, or ability to flow, with but relatively little ductility. A printing plate cast in such matrix or mold will possess fine, sharp and clear type faces with relatively wide, strong foot sections or bases merging into the body of the plate so that unusual strength is attained.

With the above recited objects and others of a similar nature in view, my invention consists in the construction, combination and arrangement of parts set forth in and falling within the scope of the appended claim.

In the accompanying drawings:

Figure 1 is a transverse sectional view showing the first step in the making of the matrix or mold.

Fig. 2 is a similar view showing a second step in the making of the matrix or mold.

Fig. 3 is a transverse sectional view taken through the completed matrix or mold.

In the practice of my invention I select a single homogeneous sheet of lead, of suitable thickness, indicated at A, and lay this upon the body of type or plate which is to be reproduced in the mold and which is shown at B. I then overlay the lead sheet with a relatively soft backing sheet shown at C and which may be of any suitable material, such as a newspaper sheet or the like, this sheet constituting a thin yielding backing, but possessing practically no resiliency. I now place this lead sheet with the paper backing sheet in a suitable press P, which has been heated to a desired temperature. The result is that the heat and moderate pressure of the press being transmitted to the lead mold sheet will soften the latter to such an extent that the type faces will penetrate the mold sheet, or be impressed therein to the required depth thus producing sharp impressions shown at 1, but as the backing sheet is yieldable but not resilient the metal of the mold sheet will not flow in such manner as to produce the pronounced swelled or curved surfaces between the type face impressions, as these swelled or curved surfaces shown at 2, are produced by the next step illustrated in Fig. 2.

After the type faces have been impressed one or more times in the mold sheet while the latter is heated as just described, the newspaper backing sheet C is removed and a sheet or blanket E possessing considerable resiliency is substituted therefor, this blanket being of rubber or other suitable material. The parts thus assembled, that is to say the type matter B, the partly finished mold sheet A and the sheet or blanket E are again subjected to heat and pressure by the press for a suitable period of time. This results in a surface flow of the lead sheet which will produce the pronounced swelling or curving of the portions of the sheet at the open points, or between the type face impressions as indicated at 2, so that when the mold is removed from the press and its back planed or shaved, it will have the appearance shown in cross section in Fig. 3. Consequently when a printing plate is reproduced by this mold it will have sharp, clear type faces surmounting foot sections or bases which widen toward and merge into the body of the plate thereby insuring a plate of great strength and one in which the projecting type will not be easily broken or stripped. It will be noted that in the present instance the lead sheet for the mold is preferably though not necessarily subjected to several impressions, with the yielding backing sheet such as the newspaper, to produce the proper depth and sharpness for the type and with the resilient blanket to produce the pronounced swelled or curved portions of the mold which are intended to reproduce the non-printing portions of the printing plate. In the making of my mold from the lead sheet, owing to the heating of the same as described, and the use of the yieldable and resilient backing sheets a mold is produced without the exercise of such pressure as might injure or crush the type or plate. After the mold has been formed as described, the back of the same may be shaved or otherwise treated to attain levelness and to conform to predetermined dimensions, that is, to make a matrix of a desired thickness which will have a flat or level solid back face so that when this matrix is laid with its flat back face on a platen, as when molding a printing plate under pressure in a press, there will be no hollows or recesses, or irregularities in the back of the matrix or mold which under the pressure of the press would give or yield downward or be flattened out, thus correspondingly affecting and ruining the molding face of the matrix.

While I have herein shown and described one embodiment of my invention, I wish it to be understood that I do not confine myself to all the precise details of construction herein set forth by way of illustration, as modification and variation may be made without departing from the spirit of the invention or exceeding the scope of the appended claim.

What I claim is:

A matrix for producing a printing plate comprising a single, solid, homogeneous lead sheet, having a front or molding face provided with type-forming depressions and non-type forming swelled or curved surface portions adjacent the depressions, said sheet having a smooth, uniform flat back face.

In testimony whereof I affix my signature.

EMIL E. NOVOTNY.